(12) United States Patent
Li et al.

(10) Patent No.: US 10,055,094 B2
(45) Date of Patent: Aug. 21, 2018

(54) METHOD AND APPARATUS FOR DYNAMICALLY DISPLAYING DEVICE LIST

(71) Applicant: Xiaomi Inc., Beijing (CN)

(72) Inventors: Feiyun Li, Beijing (CN); Yang Wang, Beijing (CN); Qiang Fu, Beijing (CN)

(73) Assignee: Xiaomi Inc., Beijing (CN)

( * ) Notice: Subject to any disclaimer, the term of this patent is extended or adjusted under 35 U.S.C. 154(b) by 427 days.

(21) Appl. No.: 14/858,704

(22) Filed: Sep. 18, 2015

(65) Prior Publication Data

US 2016/0124590 A1    May 5, 2016

Related U.S. Application Data

(63) Continuation-in-part of application No. PCT/CN2015/071877, filed on Jan. 30, 2015.

(30) Foreign Application Priority Data

Oct. 29, 2014    (CN) .......................... 2014 1 0593513

(51) Int. Cl.
*G06F 3/0482* (2013.01)
*H04L 12/28* (2006.01)

(52) U.S. Cl.
CPC ........ *G06F 3/0482* (2013.01); *H04L 12/2809* (2013.01)

(58) Field of Classification Search
CPC ............... G06F 3/0482; G06F 3/04817; G06F 3/04847; H04L 12/2803
See application file for complete search history.

(56) References Cited

U.S. PATENT DOCUMENTS

| | | | |
|---|---|---|---|
| 2003/0167307 | A1 | 9/2003 | Filepp et al. |
| 2005/0010866 | A1* | 1/2005 | Humpleman ....... H04L 12/2803 715/205 |

(Continued)

FOREIGN PATENT DOCUMENTS

| | | |
|---|---|---|
| CN | 1481119 A | 3/2004 |
| CN | 1658160 A | 8/2005 |

(Continued)

OTHER PUBLICATIONS

Extended European Search Report dated Mar. 9, 2016 for European Application No. 15191974.3, 9 pages.

(Continued)

*Primary Examiner* — Anil Bhargava
(74) *Attorney, Agent, or Firm* — Brinks, Gilson & Lione

(57) ABSTRACT

The present disclosure relates to a method and an apparatus for dynamically displaying a device list to reduce operations switched by a user between different application programs by displaying parameter contents of corresponding devices in the device list, whereby the operation is easier, and the parameter contents are displayed more intuitively and conveniently. The method includes: according to a first aspect of the embodiments of the present disclosure, there is provided a method for dynamically displaying a device list, including: detecting whether there exists a parameter display window in a device list display page after accessing the device list display page; if there exists no parameter display window, generating a parameter display window in the device list display page when a device in the device list is selected to display parameter contents, and displaying device parameter contents in the parameter display window; and displaying the device parameter contents in the parameter display window if there exists a parameter display window.

17 Claims, 9 Drawing Sheets

(56) References Cited

U.S. PATENT DOCUMENTS

| | | | | |
|---|---|---|---|---|
| 2011/0106279 | A1* | 5/2011 | Cho | G08C 17/02 700/90 |
| 2012/0266100 | A1* | 10/2012 | Caliendo, Jr. | G06F 3/04817 715/781 |
| 2013/0113822 | A1 | 5/2013 | Putrevu et al. | |
| 2014/0005809 | A1* | 1/2014 | Frei | H04L 29/1249 700/90 |
| 2014/0237519 | A1 | 8/2014 | Masuda | |

FOREIGN PATENT DOCUMENTS

| | | | |
|---|---|---|---|
| CN | 101444007 | A | 5/2009 |
| CN | 101908076 | A | 12/2010 |
| CN | 102215379 | A | 10/2011 |
| CN | 102298503 | A | 12/2011 |
| CN | 102668592 | A | 9/2012 |
| CN | 102778997 | A | 11/2012 |
| CN | 102932695 | A | 2/2013 |
| CN | 103019197 | A | 4/2013 |
| CN | 103399530 | A | 11/2013 |
| CN | 104429094 | A | 3/2015 |
| EP | 2 674 834 | A2 | 12/2013 |
| JP | 2008-529111 | A | 7/2008 |
| JP | 2014-071844 | A | 4/2014 |
| JP | 2014-160355 | A | 9/2014 |
| KR | 10-2014-0029609 | A | 3/2014 |
| KR | 10-2014-0077817 | A | 6/2014 |
| KR | 10-2014-0078518 | A | 6/2014 |
| RU | 108 611 | U1 | 9/2011 |
| WO | WO 2011/053008 | A2 | 5/2011 |
| WO | WO 2011/153225 | A1 | 12/2011 |
| WO | WO 2014/155429 | A1 | 10/2014 |

OTHER PUBLICATIONS

International Search Report dated Mar. 27, 2015 for International Application No. PCT/CN2015/071877, 8 pages.
Notice of Allowance dated Apr. 28, 2017 for Japanese Application No. 2016-555889, 3 pages.
Notice of Allowance dated Jul. 6, 2017 for Russian Application No. 2015113821/08, 23 pages.
Office Action dated Feb. 27, 2017 for Chinese Application No. 201410593513.8, 11 pages.
Office Action dated Nov. 17, 2017 for Chinese Application No. 201410593513.8, 12 pages.
Office Action dated Jan. 25, 2017 for Japanese Application No. 2016-555889, 4 pages.
Office Action dated Feb. 17, 2016 for Korean Application No. 10-2015-7007974, 6 pages.
Office Action dated May 25, 2016 for Russian Application No. 2015113821/08, 18 pages.

* cited by examiner

METHOD AND APPARATUS FOR DYNAMICALLY DISPLAYING DEVICE LIST

PRIORITY STATEMENT

This application is a continuation-in-part of International Application No. PCT/CN2015/071877, filed on Jan. 30, 2015, in the State Intellectual Property Office of the People's Republic of China, which claims the priority benefit of Chinese Patent Application No. 201410593513.8, filed on Oct. 29, 2014, the disclosures of which are incorporated herein in their entirety by reference.

TECHNICAL FIELD

The present disclosure relates to a field of communication technology, and more particularly to a method and an apparatus for dynamically displaying a device list.

BACKGROUND

Smart home system, which uses a residence (e.g., home) as a platform to integrate various of facilities related to a person's daily life by using integrated wiring technology, network communication technology, smart home-system design scheme security technology, audio and video technology, to construct an efficient management system for residential facilities and family affairs schedule. As a result, smart home system improves home security, home convenience, home comfort, and home artistry, and provides living environment for environmental protection and energy savings. Compared with common home, the smart home system not only has traditional living functions which has an efficient, comfortable, safe, convenient, eco-friendly living environment of both architecture, network communication, and management, but also provides a full range of information interactive functions.

SUMMARY

The present disclosure provides methods and apparatuses for dynamically displaying a device list to reduce the operation process of switching between different application programs. The methods and apparatuses display parameter contents of corresponding devices in the device list. The methods and apparatuses simplify operations of organizing smart devices in a smart home system, and the parameter contents are displayed more intuitively and conveniently.

According to an aspect of the present disclosure, a terminal device may include a processor-readable storage medium including a set of instructions for operating a smart home system; and a processor in communication with the storage medium. When executing the set of instructions, the processor is directed to: log in the smart home system, wherein the smart home system includes a plurality of appliances connected to a smart home server via a local network; display a list of the plurality of appliances under a predetermined format in a single appliance list display page; receive a selection from a user to a target appliance among the plurality of appliances; and display parameters of the target appliance in a parameter display window.

According to another aspect of the present disclosure, a smart home system may include a plurality of appliances and a terminal of a user connected to a smart home server via a local network, and the terminal includes a screen and a processor to execute an application configured to control the smart home system. A method for operating the smart home system may include opening, by the terminal, the application to display a list of the plurality of appliances under a predetermined format in a single appliance list display page; receiving, by the terminal from the user, a selection to a target appliance among the plurality of appliances; and displaying parameters of the target appliance in a parameter display window.

According to yet another aspect of the present disclosure, a processor-readable non-transitory storage medium may include a set of instructions for operating a smart home system, wherein when being executed by a processor of a terminal device, the set of instruction directs the processor to perform actions of: logging in the smart home system, wherein the smart home system includes a plurality of appliances connected to a smart home server via a local network; displaying a list of the plurality of appliances under a predetermined format in a single appliance list display page; receiving a selection from a user to a target appliance among the plurality of appliances; and displaying parameters of the target appliance in a parameter display window.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

A smart home is a home equipped with household appliances, such as lighting, heating, and electronic devices, that can be controlled remotely by phone or computer. At present, smart home system has gone deep into each family and various application scenarios. A smart home system is a platform that connects to a plurality of appliances and/or smart electronic terminals so that a user can manage and control operations of each of the smart terminals remotely. For example, the user may connect his/her cell phone to the smart home system to view operation status of each household appliance connected with the smart home system. The user may also use his/her cell phone to remotely control operations of the appliance through the smart home system. For example, the user may remotely turn on the lights or air conditioning system in his/her home before he/she goes back home.

In a smart home system, each smart terminal may need a specific application program to manage its operation. Thus different smart terminals may use different application programs (APPs) in order for a user to manage. When a user views and/or manage a number of smart terminals in his/her home, the user may have to log in and log out the APP of each smart terminal in order to view corresponding smart terminal parameters. Such operation may be tedious for the users.

The present disclosure provides methods and apparatuses that integrate the operation status of different smart terminals in a single APP to simplify the management of the smart home system. The different smart terminals may be appliances manufactured by different manufacturer, such that information of an appliance reported to the smart home system may be of a different format from information of another appliance. The present disclosure also provides methods and apparatuses for dynamically displaying a device list to reduce the operation process of switching between different application programs. The methods and apparatuses display parameter contents of corresponding devices in the device list. The methods and apparatuses simplify operations of organizing smart devices in a smart home system, and the parameter contents are displayed more intuitively and conveniently.

Figure 15:
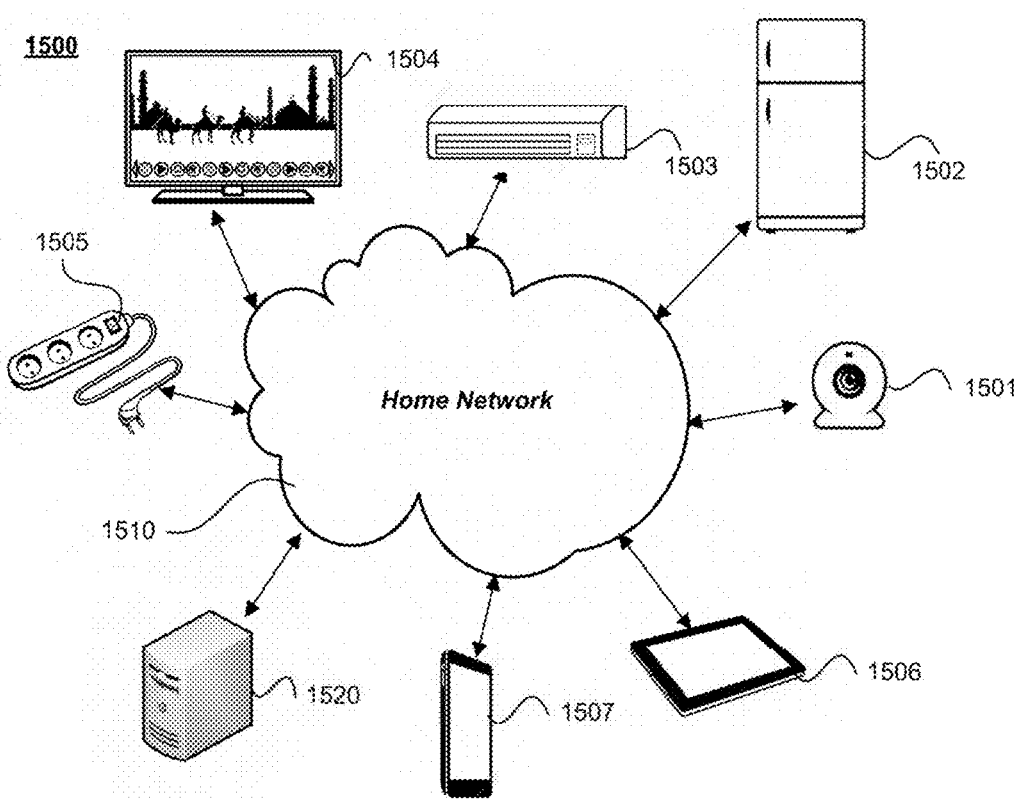
FIG. 15 is a schematic diagram illustrating a smart home system environment.

FIG. 15 is a schematic diagram of one embodiment illustrating a smart home system 1500 in which the systems and methods in the present application may be implemented. Other embodiments of the system that may vary, for example, in terms of arrangement or in terms of type of components, are also intended to be included within claimed subject matter. The smart home system may include a local home network 1510 coupling with a server 1520 and a plurality of electronic devices (i.e., terminals) 1501, 1502, 1503, 1504, 1505, 1506, 1507. The smart home system 1500 may also include mass storage (not shown), such as network attached storage (NAS), a storage area network (SAN), or other forms of computer or machine readable media.

The local home network 1500 may be one or more local area networks (LANs) and/or wide area networks (WANs), wire-line type connections, wireless type connections, or any combination thereof. The network 1500 may couple the plurality of electronic devices 1501, 1502, 1503, 1504, 1505, 1506, 1507 with the server 1520 so that communications may be exchanged between the plurality of electronic devices 1501, 1502, 1503, 1504, 1505, 1506, 1507 and the server 1520.

The server 1520 may be a local server wire or wirelessly connected to the home network, and/or may also be a remote server in Cloud. The server may be able to connect to the plurality of electronic devices in the smart home system 1500. The server 1520 may also connect to other external devices, such as a server from a manufacture of an electronic device 1501, 1502, 1503, 1504, 1505, 1506, 1507.

The electronic devices may include various appliances. Here, an appliance refers to an electronic device or piece of equipment designed to perform a specific task, typically a domestic one. For example, the appliances in FIG. 15 may include household appliances such as a webcam 1501, a refrigerator 1502, an air conditioner 1503, a TV 1504, and an electronic surge protector (or an electronic socket) 1505. The electronic device may also include more general used electronic devices such as a mobile phone 1507 and a computer 1506, which can be a desktop, laptop, or tablet computer. These electronic devices may be smart devices, which include processors and memories storing necessary software, so that each electronic device may send and receive data from the server 1520 as well as receive and execute instructions from the server 1520. Further, these electronic device may also be able to connect to and communicate with a server of its manufacturer. For example, the refrigerator 1502 may be able to send operation diagnostic data to a server of its manufacturer and receive system update data from the server of its manufacturer.

Among the plurality of electronic devices, at least one of them may serve as a master device. The master device may have an authority to display and monitor operation status of other electronic devices and instruct other electronic devices to conduct certain operations. For example, the mobile phone 1507 may include a smart home application, which enables it to be the master device of the smart home system 1500. The mobile phone 1507 may be able to connect to the server 1520, either directly through the home network 1510 or through a third party service provider when the mobile phone 1507 is not in situ. Through the smart home application and the server 1520, the mobile phone 1507 may obtain operation status and device parameters of the webcam 1501, the air conditioner 1503, or other electronic devices in the smart home system 1500. Through the server 1520, the mobile phone 1507 may also send operation instructions to the webcam 1501, the refrigerator 1502, or other electronic devices in the smart home system 1500, such as instructions to turn them on or off.

Figure 13:
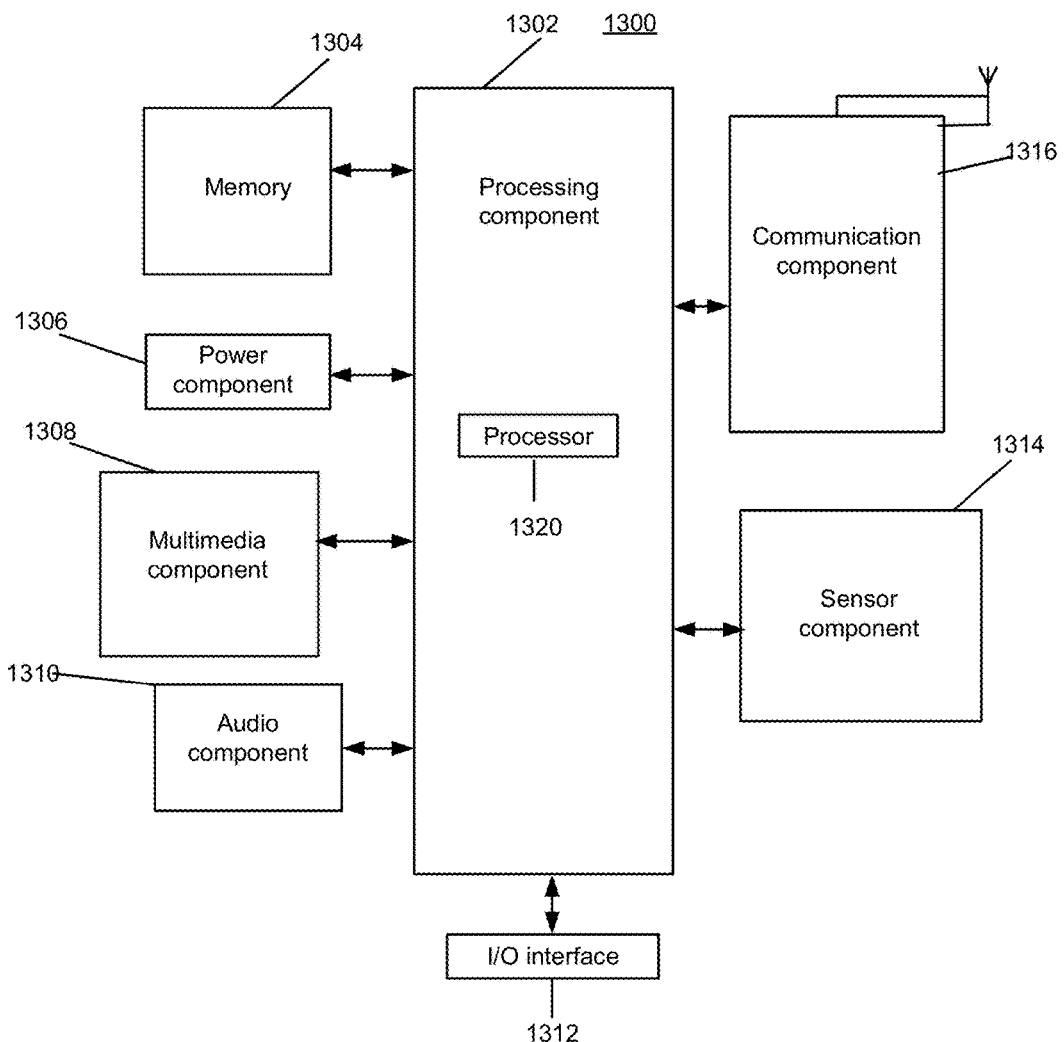
FIG. 13 is a block diagram illustrating another apparatus for dynamically displaying a device list according to an exemplary embodiment.

FIG. 13 is a block diagram illustrating a device 1300 for dynamically displaying a device list according to an exemplary embodiment. The device is applied to a terminal device. For example, the device 1300 may be a mobile phone, a computer, a digital broadcast terminal, a messaging device, a gaming console, a tablet, a medical device, exercise equipment, a personal digital assistant (PDA), or the like. The device 1300 may serve as a mobile device, such as the mobile phone 1507 in the smart home system 1500.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 usually controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any application or method operated on the device 1300, contact data, phonebook data, messages, pictures, videos, etc. The memory 1304 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1308 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the device 1300 is in an operation mode, such as a call mode, a recording mode, and a voice identification mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, a button, or the like. The button may include, but not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keyboard, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 may access a wireless network based on a communication standard, such as WI-FI, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there exists also provided a non-transitory computer readable storage medium including instructions, such as included in the memory 1304, executable by the processor in the device 1300, for performing the above method. For example, the non-transitory computer-readable storage medium may be a ROM, a random access memory (RAM), a CD-ROM, a magnetic tape, a floppy disc, an optical data storage device, or the like.

Figure 14:
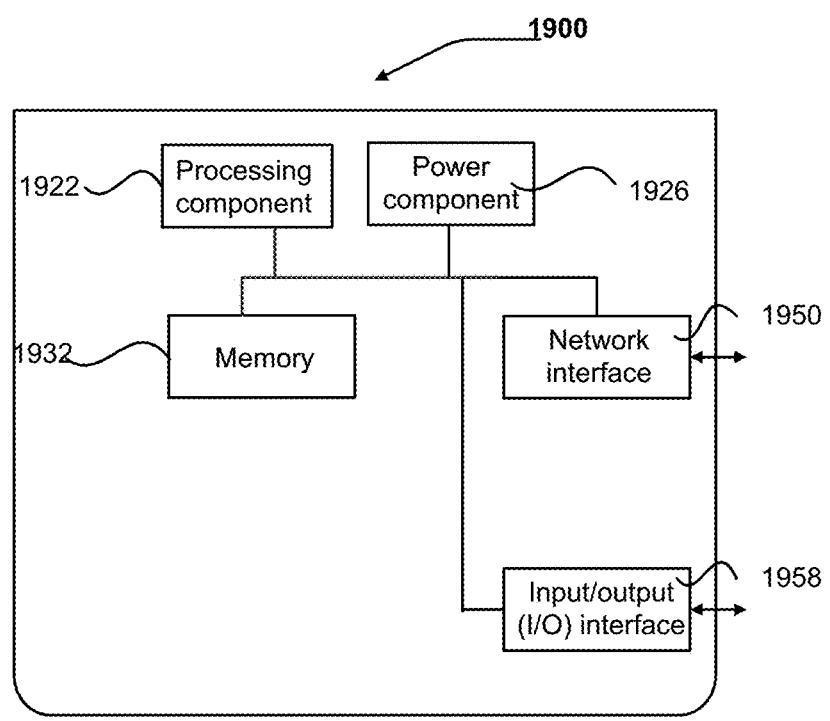
FIG. 14 is a block diagram illustrating another apparatus for dynamically displaying a device list according to an exemplary embodiment.

FIG. 14 is a block diagram of an apparatus 1900 for dynamically displaying a device list according to an exemplary embodiment. For example, the apparatus 1900 may be provided as a server 1520 in the smart home system 1500. As shown in FIG. 14, the apparatus 1900 includes a processing component 1922 that further includes one or more processors, and memory resources represented by a memory 1932 for storing instructions, such as application programs, executable by the processing component 1922. The application programs stored in memory 1932 may include one or more modules, each of which corresponds to a set of instructions. Moreover, the processing component 1922 is configured to execute instructions for performing the above described method for processing communication identification.

The apparatus 1900 may also include a power component 1926 configured to perform power management of the apparatus 1900, wired or wireless network interface(s) 1950 configured to connect the apparatus 1900 to a network, and an input/output (I/O) interface 1958. The apparatus 1900 may operate based on an operating system stored in the memory 1932, such as Windows Server™, Mac OSX™, Unix™, Linux™, FreeBSD™, or the like.

Figure 1:
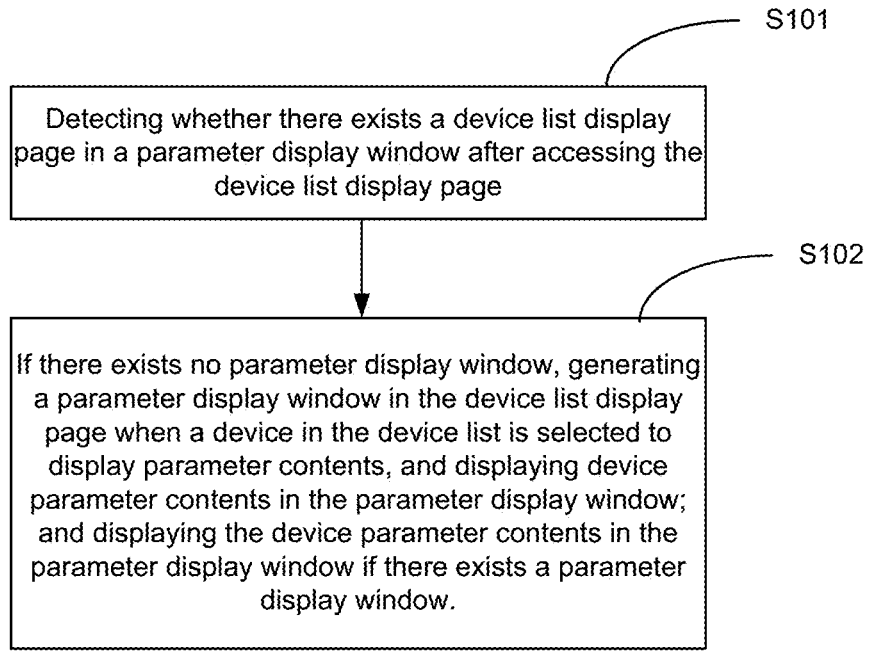
FIG. 1 is a flow chart illustrating a method for dynamically displaying a device list according to an exemplary embodiment.

FIG. 1 is a flow chart illustrating a method for dynamically displaying a device list according to an exemplary embodiment. The method may be implemented in a terminal (control terminal) that serves as a controller to other smart terminals connected to a smart system platform. For example, the smart system platform may be the smart home system 1500 and the terminal may be the device 1300 or the mobile device 1507. The method may be stored in a storage medium (e.g., the memory 1304) of the device 1300 as a set of instructions of an APP. The processor 1320 may execute the set of instruction to perform the following steps of the method.

In step 101, accessing a device list display page and determining whether there exists a parameter display window in the device list display page. When the method is implemented in the smart home system 1500, the device may be the appliances therein, and the device list may be an appliance list.

In step 102, if there exists no parameter display window, generating a parameter display window in the device list display page when a device in the device list is selected to display parameter contents, and displaying device parameter contents in the parameter display window; and displaying the device parameter contents in the parameter display window if there exists a parameter display window.

The terminal may display the device list by displaying icons of a plurality of devices connected to the smart home system and controlled by the terminal. In order to more conveniently display the parameters of any device, the parameter display window may be generated in the current page for displaying the device parameter contents. A user of the terminal may set up the APP to determine whether to generate the parameter display window and whether to display the parameters of the devices in the device list.

In an embodiment, the user may open the device list display page after log in his/her account with the smart home system. After the user enters and/or opens the device list display page, the method further comprises: acquiring a device identification bound with the current account, and displaying an icon of the bound device in the device list. The bound device corresponding to the current account is acquired after logging in the application program (APP) using the account. Each account may bind with various devices of different types, and may also bind with the same type of devices. For example, if account 1 binds with device A, device B and device C, then when a user logs in account 1 using a terminal (e.g., a mobile phone), the terminal may acquire and/or obtain the device identifications of the device A, the device B and the device C bound with the account 1, and display the icons of the bound device A, device B and device C in the device list. If account 2 binds with device d, device e and device f, then when a user logs in account 2 using a terminal (e.g., a mobile phone), the terminal may acquire and/or obtain the device identifications of the device d, the device e and the device f bound with the account 2, and display the icons of the bound device d, device e and device f in the device list.

Further, the devices that are bound to the account may be of different brands and/or has different device configurations, thereby has different device parameters, parameter formats etc. to be extracted and displayed on the terminal. When a device (a target device) joins the smart home system and is bound to the account, a server of the smart home system may obtain information of the target device and assign an individual model identification (ID) to the target device. For example, the server may assign to a Xiaomi™ TV an individual model ID xiaomi.tv.v1 and assign an air conditioner manufactured and/or distributed by Midea™ Group an individual model ID midea.aircondition.v1. The target device information may include basic information such as a device ID (DID, a unique identification of the target device), the model ID, a name (a name of the device to be displayed on the terminal device), an IP address, a MAC address (media access control address), and an icon etc. Depending one the type of the target device, the device information may also include extra information about the target device. For example, for an online camera the extra information may include URL information of the most recent image taken by the camera and how many people are watching the image etc.; for an air conditioner, the extra information may include an On/Off status of the air conditioner and room temperature information around the air conditioner. The above information may be received by the server under a predetermined format. For example, the target device may sent the device information to the server under JavaScript Object Notation (JASON), an open standard format that uses human-readable text to transmit data objects consisting of attribute-value pairs.

Alternatively, the server of the smart home system may obtain the above information from a backend server of the target device. Other than the server of the smart home system, a smart device in the smart home system may also be in communicate with a back end server from a manufacture and/or distributor of the smart device. The back end server may be able to collect the above information of the smart device and share it with other servers. Accordingly, the server of the smart home system may establish a communication with the corresponding backend server of the target device and obtain needed information therefrom. For example, when the target device is an Midea™ air conditioner, the air conditioner may report its device information to a backend server of Midea™ Group, either periodically or in real-time. Since the smart home system server communicates with the backend server, the backend server may transmit the device information to the home system server under the required format in real-time When the terminal device (e.g., a smart phone of an owner of the smart home system) opens the smart home application of the smart home system, the smart home application may request and receive the device information from the server of the smart home system. Then the smart home application may extract the device basic information therefrom and extract the extra information based on the model ID of the target device. Finally, the smart application may display the extracted information on the device list.

In an embodiment, the acquiring of the device identification bound with the current account may include: sending an account query request to a server (e.g., server 1900) after detecting that the current account has been logged in, and acquiring the device identification bound with the current account; or acquiring the device identification bound with the current account stored locally after detecting that the current account has been logged in. The server may be a computer server or a could server, such as the server 1520. If a corresponding relationship between the current account and the bound device is stored locally, the device identification may be directly acquired locally; if the corresponding relationship between the current account and the bound device is stored in a cloud server or a router, the device identification may be acquired from the cloud server or the router.

In an embodiment, the selecting of a device in the device list to display the parameter contents may include: detecting that a device icon in the device list is directly selected; or detecting that a row or a column of the device list in which a device icon is located is selected to display device parameters.

Figure 2:
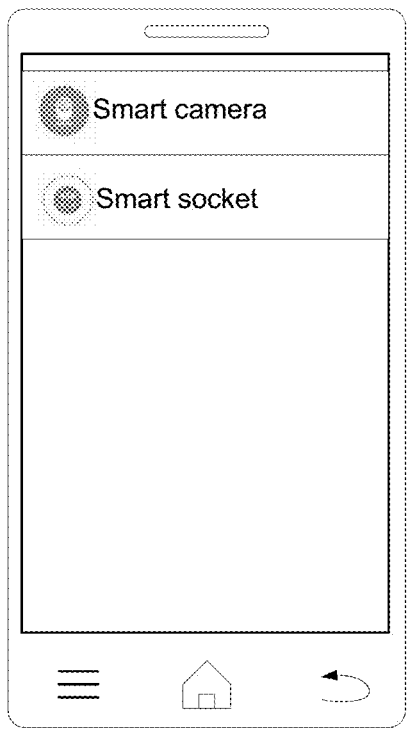
FIG. 2 is a schematic diagram illustrating a device list on a terminal according to an exemplary embodiment.

For example, FIG. 2 is a schematic diagram illustrating a device list on a terminal. The device list includes 2 rows. Each row in the device list displays an icon and a name of a device. For example, the first row of the device list displays an icon and a name of a smart camera; the second row in the device list displays an icon and a name of a smart socket. In addition, other parameters, such as but are not limited to, serial number or the like, may be also displayed.

When a user wishes to display the parameters of a device on the terminal, the user may directly select the device icon, and the row or the column in which the device icon is located may be also selected. After the device is selected to display the parameter contents, the terminal (i.e., the terminal and/or the APP) may receive the selection and directly display the parameters of the selected device. To this end, the terminal may send an instruction to a server of the smart home system to obtain the parameters of the device corresponding to the icon. The server may receive the instruction, obtain the required parameter, and send the required parameter to the terminal for display.

Figure 3:
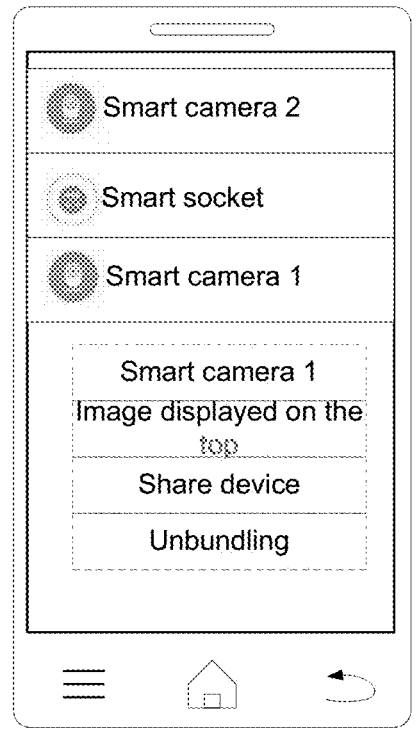
FIG. 3 is a schematic diagram illustrating an operation menu displayed in the device list according to an exemplary embodiment.

Alternatively, the terminal may display a menu to ask the user to select and/or confirm whether the parameters of the device are displayed. For example, FIG. 3 is a schematic diagram illustrating an operation menu displayed in the device list, wherein when an icon named "smart camera 1" is selected to display the parameter contents the terminal displays the operation menu on its screen. The operation menu includes an option of "image displayed on the top." By selecting this option, the terminal may send an instruction to the smart camera 1 via the server of the smart system. Upon receiving the instruction, the smart camera 1 may respond by obtaining an image and send the image back to the terminal via the server. The terminal may display the image of the smart camera 1 in the parameter display window.

The prompt option may be different for different devices, and the parameter display window may also be displayed at a different position other than the top position. For example, if the device is a smart socket, the operation menu may include an option of "electricity consumption displayed on the bottom." If the device is an air cleaner, the operation menu may include an option of "air quality displayed in the middle".

Figure 4:
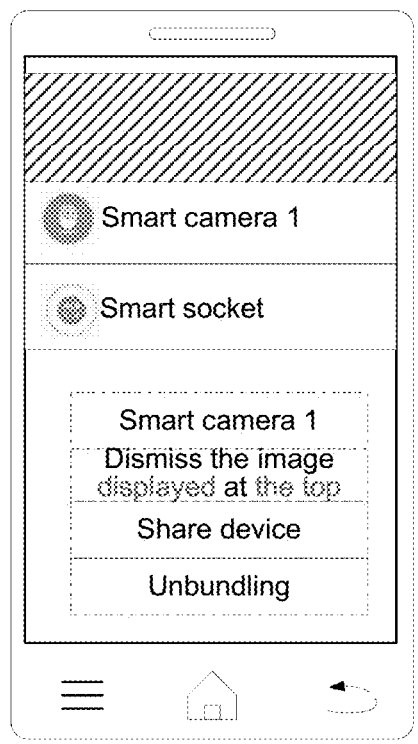
FIG. 4 is a schematic diagram illustrating an operation menu displayed in the device list according to an exemplary embodiment.

When the device parameter contents do not need to be displayed, the user may dismiss the display by a predetermined operation, for example, a predetermined gestures operation, or selecting the corresponding option. For example, as shown in FIG. 4, which is a schematic diagram illustrating an operation menu displayed in the device list, if the parameter display window (shaded area) currently displays the image collected by the "smart camera 1," when the displayed image needs to be dismissed, the device may be selected in the device list, the operation menu may be displayed, and the option of "dismiss the image displayed on the top" may be selected. If the parameter display window displays only the image collected by the "smart camera 1," the parameter display window appears after the above display is dismissed.

Figure 5A:
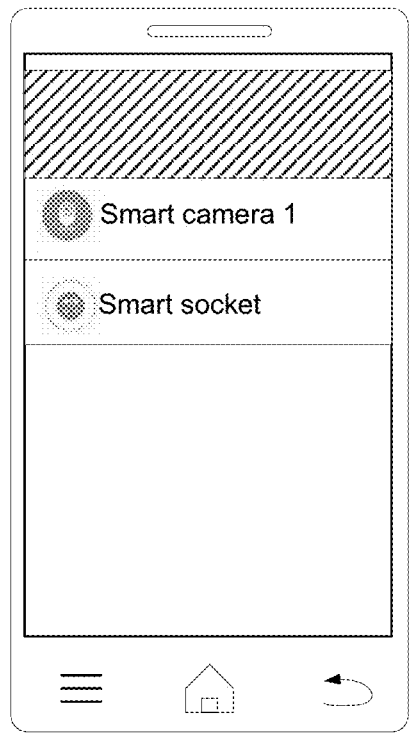
FIG. 5a and FIG. 5b are schematic diagrams illustrating a parameter display window in the device list according to an exemplary embodiment.
Figure 5B:
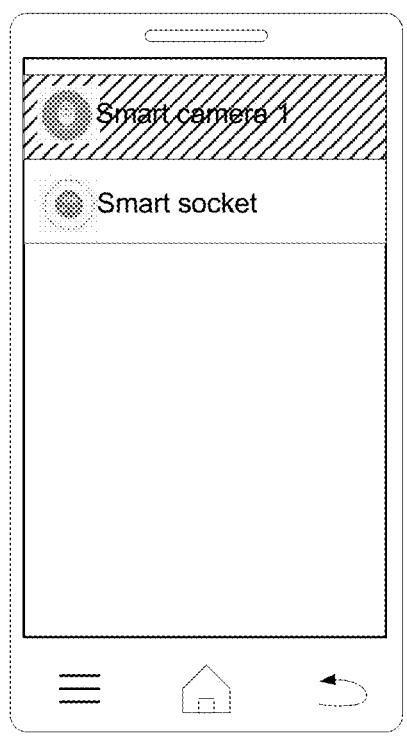

In an embodiment, the generating of the parameter display window in the device list display page may include: generating the parameter display window at a predetermined position in the device list display page; or generating the parameter display window in a row or a column in which the device selected to display the parameter contents is located. For example, the predetermined position may be any position, the parameter display window may be generated at the top of the device list display page, and the parameter display window may also be generated at the bottom or the middle of the device list display page. FIGS. 5*a* and 5*b* are schematic diagrams illustrating a parameter display window in the device list. Herein, as shown in FIG. 5*a*, it is more convenient for the user to view that the parameter display window (shaded area) is generated at the top of the device list display page. As shown in FIG. 5*b*, the parameter display window (shaded area) is generated in the row where the device selected to display the parameter contents is located.

In an embodiment, the size of the parameter display window is a predetermined size; or, the size of the parameter display window is a size of the row or the column in which the device icon selected to display the parameter contents is located; or, the size is dynamically calculated and adjusted by the terminal according to a blank area in the device list display page. For example, the height and the length of the parameter display window may be preset, and the parameter display window is generated according to the preset height and length. In an embodiment, the user may preset dimensions of the display window by presetting the length-height aspect ratio. In another example, when a blank area in the device list display page is larger than a first blank threshold, the size of the generated parameter display window is a first size. By analogy, the different size of the corresponding parameter display window may be set according to different blank areas.

In an embodiment, when the terminal dynamically adjusts the size of the parameter display window, the terminal may calculate and then adjust the height or the length of the device list in accordance with a predetermined ratio. For example, suppose the height of the current page is A, the length of the parameter display window is a, the height of the parameter display window is b, and thus the length of each row of the list in the device list is a, the height of each row of the list in the device list is c, where $b+N*a=A$ and N is the number of rows. When the size of the parameter display window is adjusted, the height of the parameter display window is changed into 2b, and then the height of the corresponding list is also adjusted, so that the parameter display window and the list may be completely displayed in the current page. The height of the current page is A, the height of the parameter display window is 2b, and then the height of each row of the list is $c1=(A-2b)/N$.

In an embodiment, the displaying the device parameter contents in the parameter display window includes: displaying the device parameter contents previously displayed in the parameter display window. Alternatively, the terminal may send an instruction and/or request to the server to acquire updating the device parameters. In response to the instruction and/or request, the server may obtain the updated device parameter data and send the updated data of the device parameter contents to the terminal. The terminal may acquire the updated data of the device parameter contents displayed in the parameter display window in real time or regularly, and display the updated device parameter contents if there exists the parameter display window after accessing the device list display page. For example, there has existed the parameter display window after accessing the device list display page, and the parameters of the camera have been set to be displayed in the parameter display window. Then, the image (which is collected by the camera) previously displayed in the parameter display window may be displayed. The image collected in real time by the camera may also be displayed when accessing the device list display page.

In an embodiment, if there exists no parameter display window after accessing the device list display page, the terminal may generate a parameter display window and display the device parameter contents corresponding to the selected device icon in the parameter display window.

Figure 6:
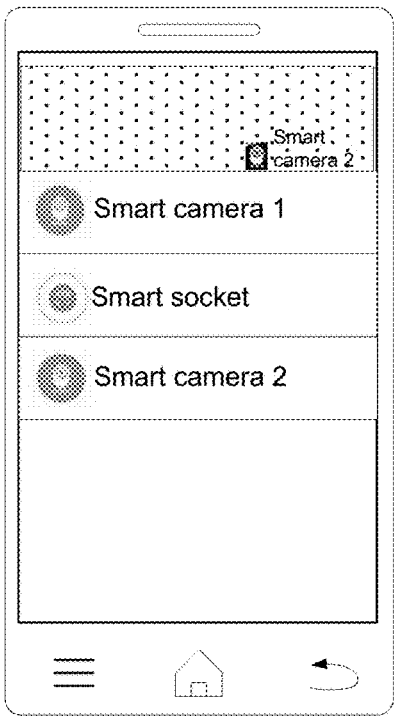
FIG. 6 is a schematic diagram illustrating a device name and a device icon displayed in the parameter display window according to an exemplary embodiment.

In an embodiment, the displaying of the device parameter contents in the parameter display window includes: displaying a device name and/or a device icon corresponding to the current parameter contents in the parameter display window. In order to better show the contents displayed in the parameter display window, the terminal may display some identification in the parameter display window. For example, the terminal may obtain and display one or more parameters of a device in the device list, such as a device name, a device icon and device position, or the like. As shown in FIG. 6, the device name "smart camera 2" and the device icon are displayed in the parameter display window.

Figure 7A:
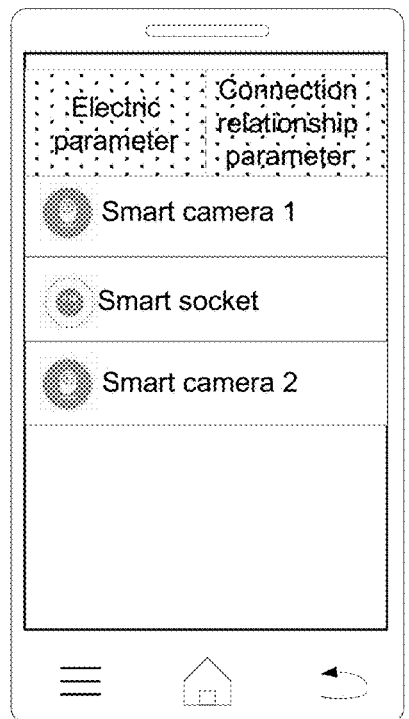
FIG. 7a and FIG. 7b are schematic diagrams illustrating parameter contents displayed in the parameter display window according to an exemplary embodiment.
Figure 7B:
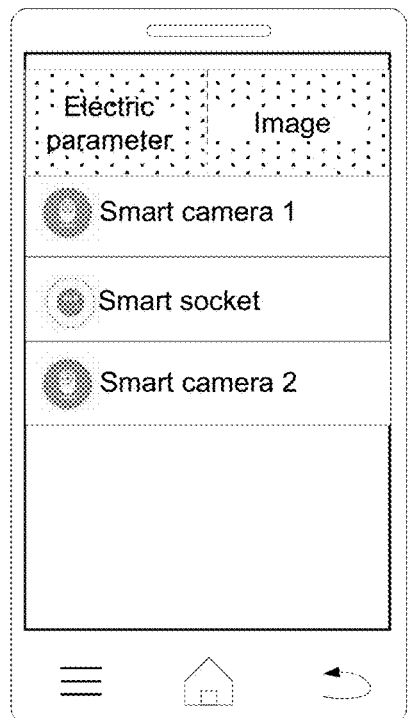

In an embodiment, the displaying of the device parameter contents in the parameter display window may include: when a plurality of parameters of a device are displayed or the parameters of a plurality of devices are displayed, dividing and/or splitting the parameter display window into split screens to display different parameters in different window regions. For example, as shown in FIG. 7a, when two parameters such as electricity consumption data collected by a "smart socket" and its connection relationship with other devices are displayed in the parameter display window, the current parameter display window may be divided into left and right window regions, which respectively display the electricity consumption parameter and the connection relationship parameter. To this end, the terminal may send an instruction to the smart socket to collect electricity consumption data and connection relationship information. Upon receiving the instruction, the smart socket, which may be remotely communicated with the terminal via the server of the smart home system, may collect the required electricity consumption data and information as to what device is connected to the smart socket, and send the above required information to the terminal for display. As shown in FIG. 7b, when the electricity consumption collected by the "smart socket" and images collected by the "smart camera" are displayed in the parameter display window, the current parameter display window may be divided into left and right window regions, which respectively display the electricity consumption parameter and the images.

The terminal may further adopt paging display in the parameter display window when a plurality of parameters of a device is displayed or the parameters of a plurality of devices are displayed. When two parameters such as the electricity consumption collected by the "smart socket" and the connection relationship with other devices are displayed in the parameter display window, the electricity consumption parameter may be displayed on the first page, and the connection relationship parameter may be displayed on the second page. When the electricity consumption collected by the "smart socket" and the image collected by the "smart camera" are displayed in the parameter display window, the electricity consumption parameter may be displayed on the first page, and the image may be displayed on the second page.

Figure 8:
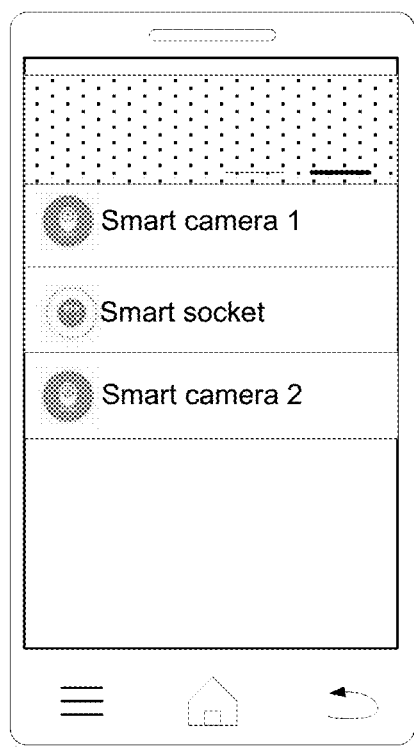
FIG. 8 is a schematic diagram illustrating a displayed current page position according to an exemplary embodiment.

In an embodiment, when a paging display is made in the parameter display window, the terminal may display a page number where a current page is located. The terminal may switch and/or turn the pages through a predetermined gesture. Herein, the manner of displaying the pagination is not limited to the digital page numbers. For example, the terminal may adopt the pagination as shown in FIG. 8: in the parameter display window, the number of the underlines indicates the number of display pages, and the underlines corresponding to the page where the currently display parameters are located may be highlighted in bold. Certainly, other forms may also be used to mark, and other details may not be listed here.

Figure 9:
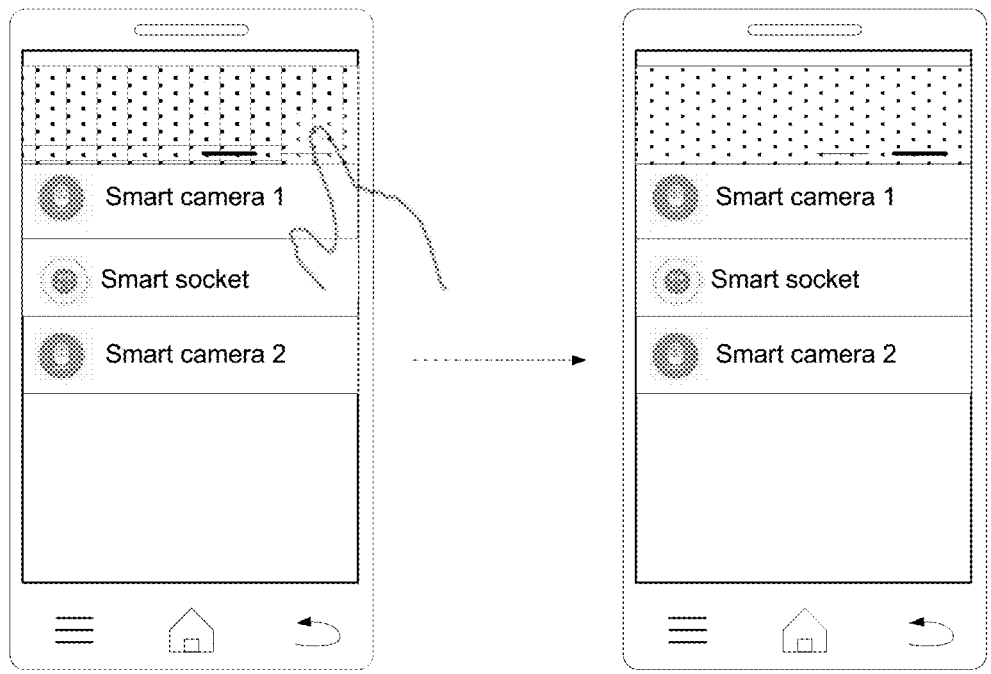
FIG. 9 is a schematic diagram illustrating slide page according to an exemplary embodiment.

The parameter display window with multiple pages may switch the display parameter through a predetermined gesture such as slide, or the like. For example, as shown in FIG. 9, the current page is a first page, and the terminal may display the parameters on a second page when detecting that a user slides his/her finger towards left on a touch screen of the terminal.

In an embodiment, when the user selects the device parameter contents displayed in the parameter display window, the terminal may jump to and/or open an operation interface of a corresponding device. For example, in the event that the content displayed in the parameter display window is an image collected by the camera, when the user clicks the image to select the camera, the terminal may open and/or switch to an operation interface of the camera. In another example, when the content displayed in the parameter display window is air index collected by the air cleaner, and when the user clicks the displayed content of the air index, the terminal may switch and/or open an operation interface of the air cleaner.

Figure 10:
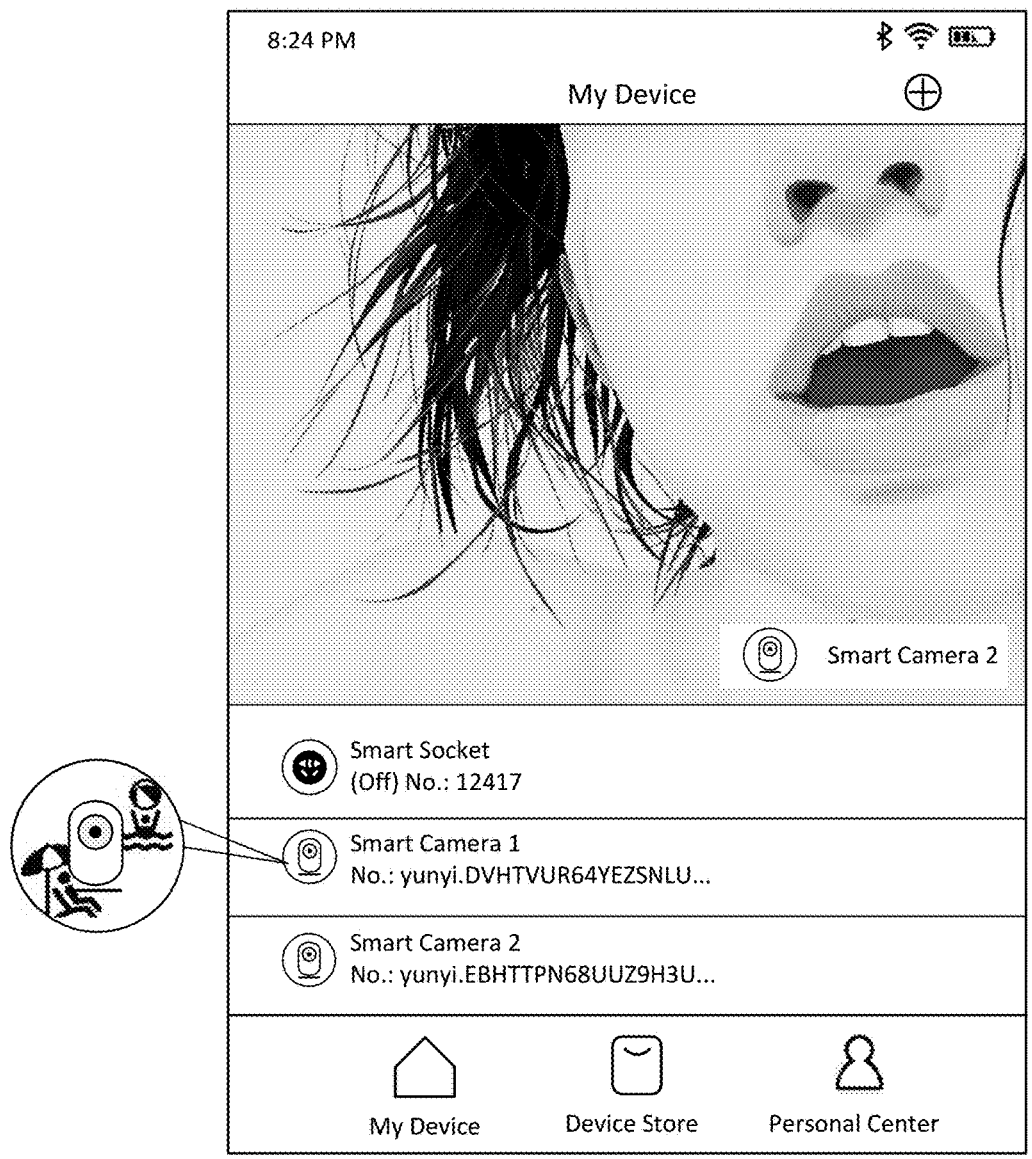
FIG. 10 is a schematic diagram illustrating an updated device icon according to an exemplary embodiment.

In an embodiment, the method may further include: combining the device parameter contents with the device icon into an updated device icon. For example, the image collected by the camera and the icon corresponding to the camera are combined and processed as an updated device icon. Each device icon may be updated according to this manner, and the device icon met with expected rules may also be updated according to this manner, or the device icon selected by the user may be updated according to this manner. For example, the current account binds with two smart cameras, wherein, the image collected by the smart camera 1 is displayed in the parameter display window, and the image collected by the smart camera 2 is not displayed in the parameter display window. As shown in FIG. 10, the image collected by the smart camera 1 and the icon corresponding to the camera are combined and processed as an updated device icon, wherein the collected image serves as a background behind the icon of the smart camera 1. In another example, the terminal may correspond the air quality collected by the air cleaner with pictures of different colors, for example, when the air quality is excellent, it corresponds to an azure picture; and when the air quality is normal, it corresponds to a dark gray picture. Then, the picture's color and the icon of the air cleaner are combined and processed as an updated device icon. For example, the colors corresponds to the air quality may be used as background of the icon.

By implementing the method provided by the embodiments of the present disclosure, the terminal may be enabled new functions to reduce operation process switched by the user between different application programs by displaying parameter contents of corresponding devices in the device list. With the new functions, operation of the terminal becomes easier, and the parameter contents are displayed more intuitively and conveniently.

Figure 11:
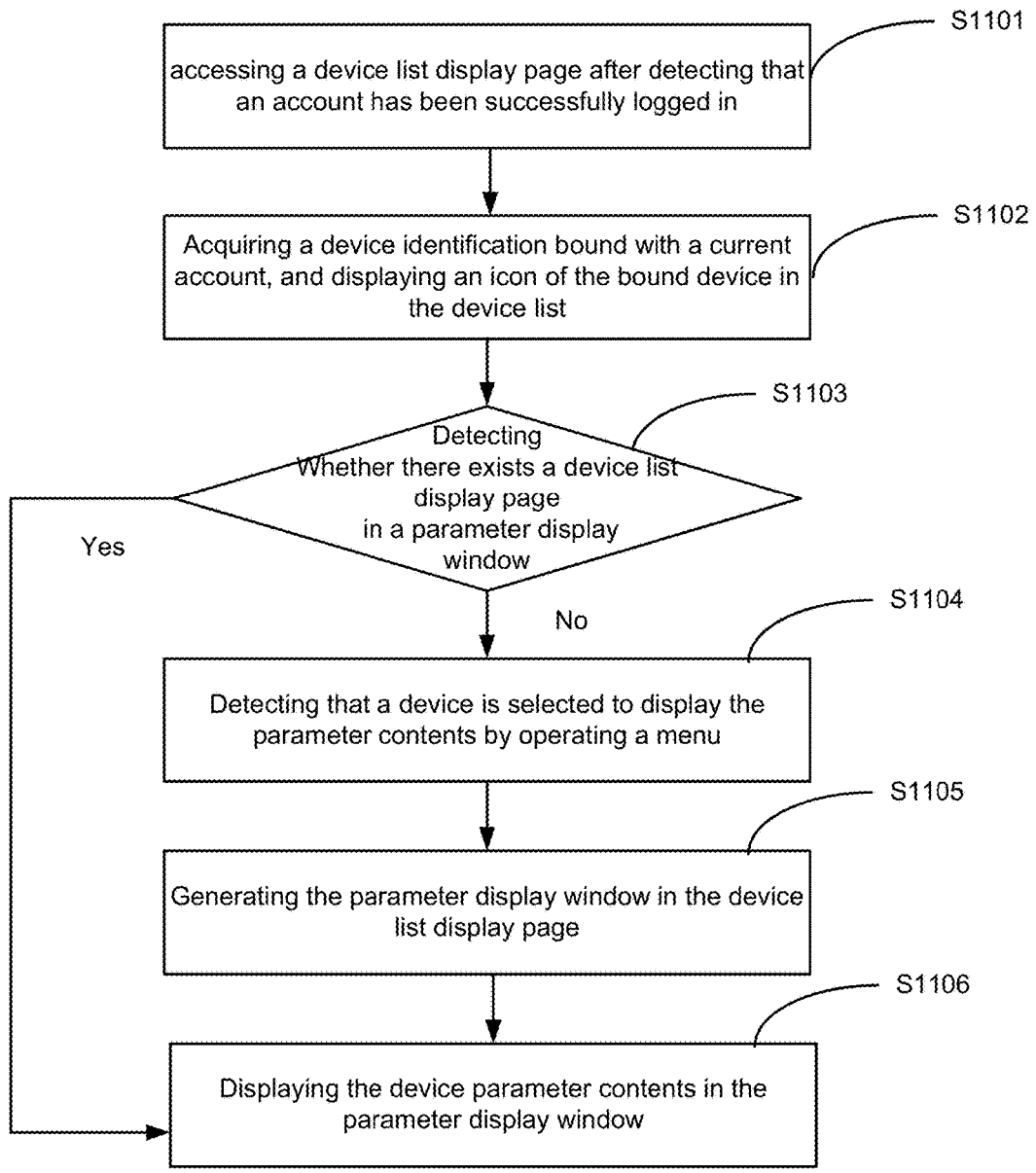
FIG. 11 is a flow chart illustrating a method for dynamically displaying a device list according to an exemplary embodiment.

FIG. 11 is a flow chart of a method for dynamically displayed a device list according to an exemplary embodiment. The method may be implemented in a terminal (control terminal or master device) connected to a smart system platform, such as the smart home system 1500. For example, the terminal may be the device 1300 serving as the mobile device 1507. The method may be stored in a storage medium (e.g., the memory 1304) of the device 1300 as a set of instructions of a single APP. The processor 1320 may execute the set of instruction to perform the following steps of the method.

In step S1101, accessing a device list display page after detecting that an account has been successfully logged in. When the method is implemented in the smart home system 1500, the device may be the appliances therein, and the device list may be an appliance list. For example, the terminal may open an application installed therein and display a list of the plurality of appliances in a single page. The plurality of appliances may be displayed in a predetermined uniform format, regardless of the brand and manufacture difference of the plurality of appliances.

In step S1102, acquiring a device identification bound with a current account, and displaying an icon of the bound device in the device list. For example, the terminal may send an account query request to a server, after the user logs in the current account, to acquire the device identification bound with the current account; or the terminal may acquire the device identification bound with the current account stored locally after detecting that the current account has been logged in.

In step S1103, detecting and/or determining whether there is a parameter display window in a device list display page. If there is no parameter display window, executing step 1104; if there is the parameter display window, executing step 1106.

In step S1104, detecting that a device in the device list is selected to display the parameter contents, wherein the device is selected by a user through an operation over a menu. For example, the operation menu is displayed after detecting that a row where device icon in the device list is located is selected, and the parameter contents of the device selected through the operation menu are displayed in the parameter display window to be generated.

In step S1105, generating the parameter display window in the device list display page. For example, the parameter display window is generated at a predetermined position (such as at the top) in the device list display page. The size of the parameter display window is a predetermined size.

In step S1106, displaying the device parameter contents in the parameter display window. For example, the device parameter contents previously displayed in the parameter display window are displayed, or, updated data of the device parameter contents displayed in the parameter display window is acquired in real time or regularly and the updated device parameter contents are displayed.

In order to better indicate the contents displayed in the parameter display window, a device name and/or a device icon corresponding to the current parameter contents may be displayed in the parameter display window.

The parameter display window may be divided into split screens to display different parameters in different window regions when a plurality of parameters of a device are displayed, or the parameters of a plurality of devices are displayed; or a paging display in the parameter display window may be made when a plurality of parameters of a device are displayed, or the parameters of a plurality of devices are displayed. For example, as shown in FIG. 7*a*, when two parameters such as the electricity consumption collected by the "smart socket" and the connection relationship with other devices are displayed in the parameter display window, the current parameter display window may be divided into left and right window regions, which respectively display the electricity consumption parameter and the connection relationship parameter. As shown in FIG. 7*b*, when the electricity consumption collected by the "smart socket" and images collected by the "smart camera" are displayed in the parameter display window, the current parameter display window may be divided into left and right window regions, which respectively display the electricity consumption parameter and the images.

A paging display in the parameter display window is made when a plurality of parameters of a device is displayed, or the parameters of a plurality of devices are displayed. When two parameters such as the electricity consumption collected by the "smart socket" and the connection relationship with other devices are displayed in the parameter display window, the electricity consumption parameter may be displayed on a first page, and the connection relationship parameter may be displayed on a second page. When the electricity consumption collected by the "smart socket" and images collected by the "smart camera" are displayed in the parameter display window, the electricity consumption parameter may be displayed on the first page, and the images may be displayed on the second page.

The method provided by the present embodiment may reduce operation process switched by the user between different application programs by displaying parameter contents of corresponding devices in the device list, whereby the operation is easier, and the parameter contents are displayed more intuitively and conveniently.

Figure 12:
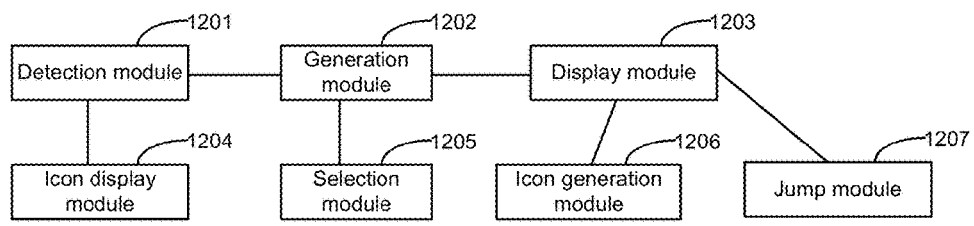
FIG. 12 is a block diagram illustrating an apparatus for dynamically displaying a device list according to an exemplary embodiment.

The embodiment of the present disclosure provides an apparatus for dynamically displaying a device list, as shown in FIG. 12, including:

a detection module 1201 configured to detect whether there exists a parameter display window in a device list display page after accessing the device list display page;

a generation module 1202 configured to if there exists no parameter display window, generate a parameter display window in the device list display page when a device icon in the device list is selected to display parameter contents, and display device parameter contents in the parameter display window; and a display module 1203 configured to display the device parameter contents in the parameter display window if there exists a parameter display window.

In an embodiment, the apparatus further includes:

an icon display module 1204 configured to acquire a device identification bound with a current account, and display an icon of the bound device in the device list.

In an embodiment, the icon display module 1204 is further configured to after detecting that the current account has been logged in, send an account query request to a server, and acquire the device identification bound with the current account; or acquire the device identification bound with the current account stored locally after detecting that the current account has been logged in.

In an embodiment, the apparatus further includes: a selection module 1205 configured to detect that a device icon in the device list is selected; or detect that a row or a column in which a device icon in the device list is located is selected; or detect that a device is selected to display the parameter contents by operating a menu.

In an embodiment, the generation module 1202 is configured to generate the parameter display window at a predetermined position in the device list display page; or generate the parameter display window in a row or a column in which the device selected to display the parameter contents is located.

In an embodiment, the size of the parameter display window generated by the generation module 1202 is a predetermined size; or, the size of the parameter display window is a size of the row or the column in which the device icon selected to display the parameter contents is located; or, the size is dynamically adjusted according to a blank area in the device list display page.

In an embodiment, the height of the list or the length of the list in the device list is correspondingly adjusted in a predetermined ratio when the size of the parameter display window generated by the generation module 1202 is dynamically adjusted.

In an embodiment, the display module 1203 configured to if there exists the parameter display window after accessing the device list display page, display the device parameter contents previously displayed in the parameter display window, or, acquire updated data of the device parameter contents displayed in the parameter display window in real time or regularly, and display the updated device parameter contents; and if there exists no parameter display window after accessing the device list display page, display the device parameter contents corresponding to the selected device icon in the parameter display window.

In an embodiment, the display module 1203 is configured to display a device name and/or a device icon corresponding to the current parameter contents in the parameter display window.

In an embodiment, the display module 1203 configured to divide the parameter display window into split screens to display different parameters in different window regions when a plurality of parameters of a device are displayed, or the parameters of a plurality of devices are displayed; or, make a paging display in the parameter display window when a plurality of parameters of a device are displayed, or the parameters of a plurality of devices are displayed.

In an embodiment, the display module 1203 is configured to when a paging display is made in the parameter display window, display in a current displayed page pagination at which a current page is located; and switch the current page through a predetermined gesture.

In an embodiment, the apparatus further includes:
an icon generation module 1206 configured to combine the device parameter contents with the device icon into an updated device icon.

In an embodiment, the display module 1203 is further configured to when the device parameter contents displayed for a device in the parameter display window are dismissed, cancel the displaying of the dismissed device parameter contents; and when all the parameter contents displayed in the parameter display window are dismissed, cancel the parameter display window.

In an embodiment, the apparatus further includes:
a jump module 1207 configured to jump to an operation interface of a device corresponding to the device parameter contents when the device parameter contents displayed in the parameter display window are selected.

The technical solution provided by the embodiments of the present disclosure may reduce operation process switched by the user between different application programs by displaying parameter contents of corresponding devices in the device list, whereby the operation is easier, and the parameter contents are displayed more intuitively and conveniently.

With regard to the apparatus in the above embodiment, detailed description of specific manner for conducting operation of modules has been made in the embodiment related to the method, and no detailed illustration will be made herein.

An apparatus for dynamically displaying a device list, including:
a processor; and
a memory for storing instructions executable by the processor;
wherein the processor is configured to:
detect whether there exists a parameter display window in a device list display page after accessing the device list display page;
if there exists no parameter display window, generate a parameter display window in the device list display page after a device icon in the device list is selected to display parameter contents, and display device parameter contents in the parameter display window; and
display the device parameter contents in the parameter display window if there exists a parameter display window.

A non-transitory computer readable storage medium, when instructions in the storage medium are executed by the processor of a terminal, the terminal may execute a method for dynamically displaying a device list, the method includes:
detecting whether there exists a parameter display window in a device list display page after accessing the device list display page;
if there exists no parameter display window, generating a parameter display window in the device list display page after selecting a device in the device list to display parameter contents, and displaying the device parameter contents in the parameter display window; and
displaying the device parameter contents in the parameter display window if there exists a parameter display window.

In an embodiment, after accessing the device list display page further, the method further comprises: acquiring a device identification bound with a current account, and displaying an icon of the bound device in the device list.

In an embodiment, the acquiring the device identification bound with the current account includes:
sending an account query request to a server after detecting that the current account has been logged in, and acquiring the device identification bound with the current account; or
acquiring the device identification bound with the current account stored locally after detecting that the current account has been logged in.

In an embodiment, the selecting a device in the device list to display the parameter contents comprises:
  detecting that a device icon in the device list is selected; or
  detecting that a row or a column in which a device icon in the device list is located is selected; or
  detecting that a device is selected to display the parameter contents by operating a menu.

In an embodiment, the generating the parameter display window in the device list display page includes:
  generating the parameter display window at a predetermined position in the device list display page; or
  generating the parameter display window in a row or a column in which the device selected to display the parameter contents is located.

In an embodiment, the size of the parameter display window is a predetermined size; or, the size of the parameter display window is a size of the row or the column in which the device icon selected to display the parameter contents is located; or, the size is dynamically adjusted according to a blank area in the device list display page.

In an embodiment, the height of the list or the length of the list in the device list is corresponding adjusted in a predetermined ratio when the size of the parameter display window is dynamically adjusted.

In an embodiment, the displaying the device parameter contents in the parameter display window includes:
  if there exists the parameter display window after accessing the device list display page, displaying the device parameter contents previously displayed in the parameter display window, or, acquiring updated data of the device parameter contents displayed in the parameter display window in real time or regularly and displaying the updated device parameter contents; and
  displaying the device parameter contents corresponding to the selected device icon in the parameter display window if there exists no parameter display window after accessing the device list display page.

In an embodiment, the displaying the device parameter contents in the parameter display window includes:
  displaying a device name and/or a device icon corresponding to the current parameter contents in the parameter display window.

In an embodiment, the displaying the device parameter contents in the parameter display window includes:
  dividing the parameter display window into split screens to display different parameters in different window regions when a plurality of parameters of a device are displayed, or the parameters of a plurality of devices are displayed; or,
  making a paging display in the parameter display window when a plurality of parameters of a device are displayed, or the parameters of a plurality of devices are displayed.

In an embodiment, the method further includes when a paging display is made in the parameter display window, displaying in a current displayed page pagination at which a current page is located; and switching the current page through a predetermined gesture.

In an embodiment, the method further includes: combining the device parameter contents with the device icon into an updated device icon.

In an embodiment, the method further includes:
  when the device parameter contents displayed for any device in the parameter display window are dismissed, cancelling the displaying of the dismissed device parameter contents; and When all the parameter contents displayed in the parameter display window are dismissed, cancelling the parameter display window.

In an embodiment, the method further includes: jumping to an operation interface of a device corresponding to the device parameter contents when the device parameter contents displayed in the parameter display window are selected.

The method provided by the embodiments of the present disclosure may reduce operation process switched by the user between different application programs by displaying parameter contents of corresponding devices in the device list, whereby the operation is easier, and the parameter contents are displayed more intuitively and conveniently.

After considering this description and carrying out the embodiments disclosed herein, those skilled in the art may easily anticipate other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

The invention claimed is:

1. A terminal device, comprising:
  a processor-readable storage medium including a set of instructions for operating a smart home system; and
  a processor in communication with the storage medium, wherein when executing the set of instructions, the processor is directed to:
    log in the smart home system, wherein the smart home system includes a plurality of appliances connected to a smart home server via a local network;
    display a list of the plurality of appliances in a first predetermined uniform format in a single appliance list display page;
    receive a selection from a user to a target appliance among the plurality of appliances;
    display parameters of the target appliance in a parameter display window; and
  wherein the plurality of appliances are manufactured by at least two different manufacturers, information reported to the smart home system by the plurality of appliances manufactured by the at least two different manufacturers is of different formats, and the parameters of the target appliance are displayed in a second predetermined format.

2. The terminal device according to claim 1, wherein the processor is further directed to:
  log in an account associated with the smart home system to access information of the plurality of appliances;
  for each of the plurality of appliances,
    acquire an appliance identification bound with the account; and
    display an icon of the appliance.

3. The terminal device according to claim 2, wherein, to acquire the appliance identification the processor is further directed to:

send an account query request to the smart home server of the smart home system, and receiving the appliance identification from the smart home server; or acquire the appliance identification locally from the terminal device.

4. The terminal device according to claim 2, wherein the processor is further directed to combine the appliance parameters with the appliance icon into an updated appliance icon.

5. The terminal device according to claim 1, wherein to receive the selection to the target appliance the processor is further directed to:

detect that the appliance icon corresponding to the target appliance is selected;

detect that a row or a column in which the appliance icon corresponding to the target appliance is located is selected; or detect an operation on a menu that selects the target appliance.

6. A method for operating a smart home system, wherein the smart home system includes a plurality of appliances and a terminal of a user connected to a smart home server via a local network, and the terminal includes a screen and a processor to execute an application configured to control the smart home system, the method comprising:

opening, by the terminal, the application to display a list of the plurality of appliances in a first predetermined uniform format in a single appliance list display page;

receiving, by the terminal from the user, a selection to a target appliance among the plurality of appliances;

displaying parameters of the target appliance in a parameter display window; and wherein the plurality of appliances are manufactured by at least two different manufacturers, information reported to the smart home system by the plurality of appliances manufactured by the at least two different manufacturers is of different formats, and the parameters of the target appliance are displayed in a second predetermined format.

7. The method according to claim 6, further comprising:

logging in, by the terminal, an account associated with the smart home system to access information of the plurality of appliances;

for each of the plurality of appliances,
acquiring, by the terminal, an appliance identification bound with the account; and
displaying an icon of the appliance.

8. The method according to claim 7, wherein, the acquiring of the appliance identification comprises:

sending an account query request to the smart home server of the smart home system, and receiving the appliance identification from the smart home server; or acquiring the appliance identification locally from the terminal.

9. The method according to claim 7, comprising:

combining the appliance parameters with the appliance icon into an updated appliance icon.

10. The method according claim 6, wherein the receiving of the selection to the target appliance comprises:

detecting that the appliance icon corresponding to the target appliance is selected;

detecting that a row or a column in which the appliance icon corresponding to the target appliance is located is selected; or detecting an operation on a menu that selects the target appliance.

11. The method according to claim 6, wherein, the displaying of the appliance parameters comprises:

acquiring updated data of the appliance parameters in real time or regularly, and displaying the updated data of the appliance parameters.

12. The method according to claim 6, comprising:

when the appliance parameters displayed for the target appliance in the parameter display window are dismissed, cancelling displaying of the dismissed appliance parameters; and when all the appliance parameters displayed in the parameter display window are dismissed, cancelling the parameter display window.

13. A processor-readable non-transitory storage medium, comprising a set of instructions for operating a smart home system, wherein when being executed by a processor of a terminal device, the set of instruction directs the processor to perform actions of:

logging in the smart home system, wherein the smart home system includes a plurality of appliances connected to a smart home server via a local network;

displaying a list of the plurality of appliances in a first predetermined uniform format in a single appliance list display page;

receiving a selection from a user to a target appliance among the plurality of appliances;

displaying parameters of the target appliance in a parameter display window; and wherein the plurality of appliances are manufactured by at least two different manufacturers, information reported to the smart home system by the plurality of appliances manufactured by the at least two different manufacturers is of different formats, and the parameters of the target appliance are displayed in a second predetermined format.

14. The storage medium according to claim 13, wherein the set of instructions further directs the processor to perform actions of:

log in an account associated with the smart home system to access information of the plurality of appliances;

for each of the plurality of appliances,
acquiring an appliance identification bound with the account; and
displaying an icon of the appliance.

15. The storage medium according to claim 14, wherein, the acquiring of the appliance identification comprises:

sending an account query request to the smart home server of the smart home system, and receiving the appliance identification from the smart home server; or acquiring the appliance identification locally from the terminal device.

16. The storage medium according to claim 14, wherein the set of instructions further directs the processor to perform acts of combining the appliance parameters with the appliance icon into an updated appliance icon.

17. The storage medium according to claim 13, wherein the receiving of the selection to the target appliance comprises:

detecting that the appliance icon corresponding to the target appliance is selected;

detecting that a row or a column in which the appliance icon corresponding to the target appliance is located is selected; or detecting an operation on a menu that selects the target appliance.

* * * * *